_United States Patent_ [19]

Smith

[11] 4,412,250
[45] Oct. 25, 1983

[54] MEMORY-TYPE SYNC GENERATOR WITH REDUCED MEMORY REQUIREMENTS

[75] Inventor: Terrence R. Smith, Clementon, N.J.

[73] Assignee: RCA Corporation, New York, N.Y.

[21] Appl. No.: 277,018

[22] Filed: Jun. 24, 1981

[51] Int. Cl.³ .............................................. H04N 5/06
[52] U.S. Cl. .................................................. 358/150
[58] Field of Search ............... 358/127, 150, 260, 261, 358/138, 17, 19; 365/94, 233, 239, 236, 189

[56] References Cited

U.S. PATENT DOCUMENTS

| | | | |
|---|---|---|---|
| 3,383,461 | 5/1968 | Dryden | 358/138 |
| 4,169,659 | 10/1979 | Marlowe | 358/150 |
| 4,280,138 | 7/1981 | Stock | 358/150 |
| 4,291,299 | 9/1981 | Hinz et al. | 358/261 |
| 4,316,219 | 2/1982 | Smith et al. | 358/150 |

FOREIGN PATENT DOCUMENTS 1418457 12/1975 United Kingdom .................. 365/94

_Primary Examiner_—John C. Martin
_Attorney, Agent, or Firm_—E. M. Whitacre; W. H. Meise; H. I. Steckler

[57] ABSTRACT

A television sync signal generator adapted for ready conversion among various television standards includes a memory in which information related to the amplitude of at least one component of a composite sync signal is stored at address locations each corresponding to at least one particular time in each recurrent television frame. A clock signal generator addresses the memory to sequentially read out the information so the sync signal can be reconstructed. For reducing the number of memory addresses required, each memory address contains information relating to the instantaneous resolution or clock rate. A sample rate controller is coupled to the memory for having the instantaneous clock address rate controlled in response to the contents of the memory.

1 Claim, 9 Drawing Figures

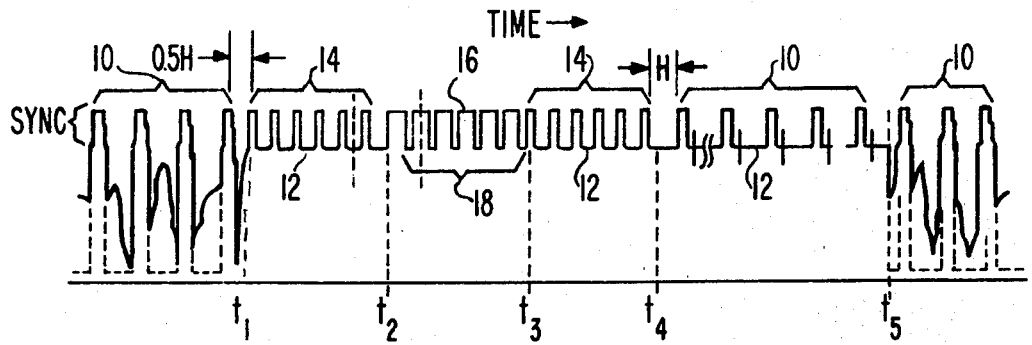
Fig. 1
PRIOR ART
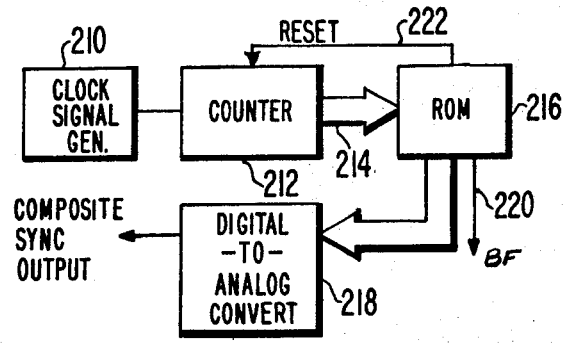
PRIOR ART
Fig. 2
Fig. 3
PRIOR ART

MEMORY-TYPE SYNC GENERATOR WITH REDUCED MEMORY REQUIREMENTS

This invention relates to memory reduction in a sync generator of the type in which a clocked memory produces the sync signal.

There are four main television standards in use throughout the world; NTSC, SECAM, PAL and PAL-M. Making sync generators for TV receivers in each of these standards is economically justified by large manufacturing volume. Studio apparatus such as cameras and tape recorders which use sync generators are made in smaller quantities, and it is difficult to justify making a sync generator for just one standard due to the low volume involved. One solution is shown in U.S. Pat. No. 4,169,659 issued Oct. 2, 1979 in the name of Marlowe, which shows a sync generator that is adaptable to different standards. However, in such an arrangement a cost penalty is incurred on each unit because it must include portions applicable only to other standards, even though they may never be used. Further, once built, the adaptable unit cannot be readily changed to produce different pulses as may be required, e.g., a pulse occurring at the 19th horizontal line to control insertion of vertical interval test signal when the unit was designed to produce a pulse on the 21st horizontal line. Another problem is that the circuit cannot be changed without complete redesign of hardware to generate a new standard as this may become necessary. For example, one standard that is sometimes used has 24 frames per second to match that of film, and 655 lines per frame, which standard has the same bandwidth as that of NTSC.

Copending Application Ser. No. 169,680 filed July 17, 1980 in the names of Smith and Marlowe entitled "SYNCHRONIZING CIRCUIT ADAPTABLE NOW U.S. PAT. NO. 4,316,219, FOR VARIOUS TV STANDARDS", describes a sync generator in which a ROM memory is addressed by a clock, and the ROM contains a multiplicity of addresses loaded with data representative of the voltage of the sync signal at times corresponding to the address. This arrangement is readily adaptable in the field among both present and possible future sync standards by simply reprogramming the ROM or replacing it with one programmed with the desired standard. The simplest embodiment has a ROM capable of holding an entire frame of sync information, but such a ROM for an NTSC sync generator requires a number of addresses equal to the number of clock pulses at four times the subcarrier rate (4×SC) which occur during a frame, which is about 500,000. Each address contains three bits or more, so the memory requirement may be as high as 1.5 million bits. A memory reduction scheme is also described in the aforementioned Marlowe and Smith application in which redundancy is reduced by breaking the sync information into half-horizontal-lines and repeatedly reusing those sections of memory in which redundant half-lines are stored. This significantly reduces the memory requirements. Further memory reduction may be desirable.

SUMMARY OF THE INVENTION

A television sync signal generator adapted for ready conversion among various television standards includes a memory in which information related to the amplitude of at least one component of a composite sync signal is stored at address locations each corresponding to at least one particular time in each recurrent television frame. A clock signal generator addresses the memory to sequentially read out the information so the sync signal can be reconstructed. For reducing the number of memory addresses required, each memory address contains information relating to the instantaneous resolution. A sample rate controller is coupled to the memory for having the instantaneous address rate controlled in response to the contents of the memory.

DESCRIPTION OF THE DRAWINGS

FIG. 1 is a drawing of an NTSC composite video signal around the vertical blanking interval;

FIG. 2 is a block diagram of a prior art sync signal generator;

FIG. 3 is a detailed block diagram of another prior art sync signal generator;

DETAILED DESCRIPTION

Figure 4:
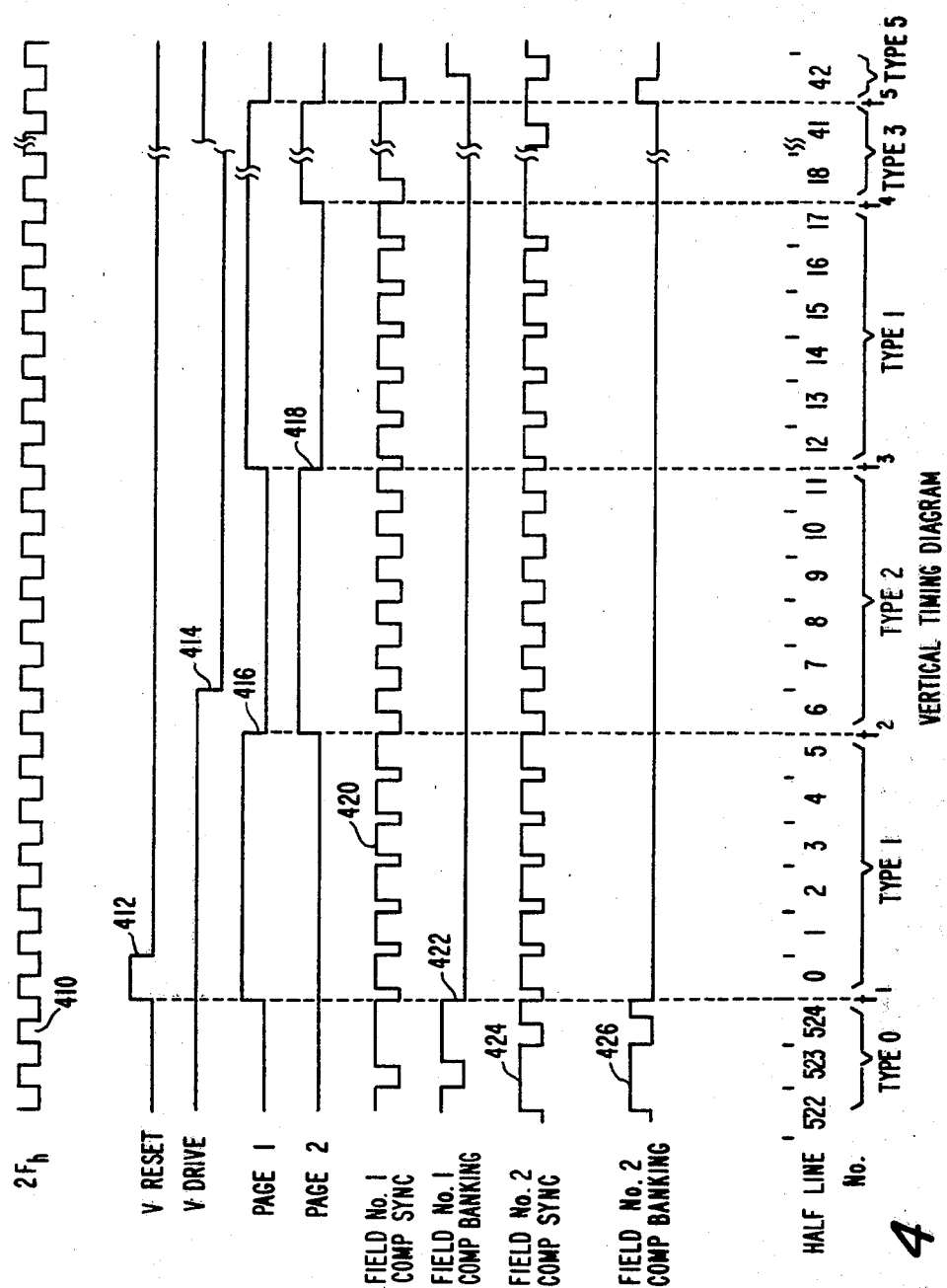
FIGS. 4 and 5 are timing diagrams of vertical and horizontal-rate signals respectively, present in FIG. 3.

FIG. 1 illustrates an NTSC composite video signal in the region about the vertical blanking interval of one television field. Positive-going pulses 10 are the horizontal synchronizing signals occurring before time t1 near the bottom of the raster. During the next time interval t1-t2, the composite signal comprises the amplitude sum or superposition of the vertical blanking pulse 12 and six equalizing pulses 14. In the next interval t2-t3, the composite signal comprises the superposition of the vertical blanking signal 12 and a vertical sync signal 16 serrated by negative-going equalizing pulses 18. During the next interval t3-t4, the composite signal comprises the vertical blanking signal 12 summed with further equalizing pulses 14. The composite signal in interval t3-t4 is identical to that in the interval t1-t2. The composite signal during the next following interval t4-t5 comprises the sum of the vertical blanking signal 12 and horizontal sync pulses 10. Interval t4-t5 has a duration established by the number of horizontal lines selected in accordance with the desired application within the television synchronizing standard being used. In the time following t5 and extending until the next time t1 of the beginning of the next following vertical blanking signal, the composite signal is as described above for the time preceding time t1. The composite sync for the second NTSC field of a frame is identical except for certain half-line time shifts.

FIG. 2 illustrates in simplified block diagram form a television composite synchronizing and blanking signal generator.

FIG. 2 shows a clock signal generator 210. A counter 212 is coupled to generator 210 for counting clock pulses and provides a decoded output signal on parallel output lines illustrated as a broad arrow 214. The decoded signal uniquely represents each state of the counter 212 as it counts clock pulses. A digital read-only memory (ROM) 216 is addressed by the signals on lines 214. Thus, each unique state of counter 212 addresses a single memory location in ROM 216. Each memory location of ROM 216 has sufficient bit storage capacity for the number of levels required to synthesize the instantaneous amplitude of the desired waveform. With 8 bits, a signal having 256 levels can be synthesized. To synthesize the sync waveform of FIG. 1, only three levels are required; white, blanking and sync levels, which requires a storage capacity of 2 bits. The two bits representing the three levels are provided by ROM 216 to a D-to-A converter 218 to sequentially generate at the clock rate the desired 3-level analog output signals.

In the event that the sync standard being used requires a count of clock pulses less than the maximum count of which counter 212 is capable, the counter may be reset at the proper count (representing the number of clock pulses in one field or one frame, as required). The reset is accomplished by a pulse generated by ROM 216 and applied over a conductor or line 222 to counter 212. It should be noted that the reset information requires another one-bit section of memory in ROM 216; consequently, the data path of ROM 216 must be a minimum of 3 bits in width.

Other synchronization and control signals can be provided by ROM 216. For example, output 220 can provide a burst flag. In this case, each ROM memory location must have a storage capacity of four bits, two of which are used as described to generate the composite sync and blanking signal, and one of which resets the counter as described above, and a further one of which is used to control the instantaneous value which the burst flag is to have. In a similar manner, other control signals such as horizontal and vertical drive can be provided by providing sufficient additional memory capacity.

The above-described arrangement carries the information to generate television sync and blanking signals for any desired standard in the form of the programming of various memory locations. Change from one standard to another within a particular piece of equipment can be accomplished by changing the program ROM 216, or alternately by replacing the ROM with one appropriately programmed. Reprogramming of ROM (PROM) such as one which can be erased by ultraviolet light (EPROM) is accomplished by first erasing the unwanted current program, and using an appropriate programmer for imposing the desired program on the memory. Replacing ROM 216 can be easily accomplished if it is mounted in an integrated circuit socket.

The memory capacity required for the above-described described arrangement is large. The memory requirements can be reduced as described in the aforementioned Smith-Marlowe application by exploiting the cyclically redundant nature of the components making up the composite sync and blanking signals.

It will be noted that in FIG. 1 the signal in the interval between times t1 and t2 is of the same shape and has the same amplitude (on a line-to-line basis) as the signal between times t3 and t4. Consequently, the signal can be generated by recurrently addressing the same ROM memory addresses. These intervals form what is termed a type 1 interval. Next is the interval between times t2 and t3 which is termed a type 2 interval. The sync and blanking signals during the type 2 interval are generated by addressing another portion of the ROM. The signals present during the interval between times t4 and t5 are different in amplitude and shape than those in the aforementioned intervals. The interval t4-t5 is a type 3 interval, and the sync and blanking signals produce during a type 3 interval are generated by addressing still another portion of the ROM. The last type of interval is a type 0 interval, which occurs before time t1 and after time t5, and corresponds to the main portion of the television signal during which active video is present. Yet another portion of the ROM is used to store the information relating to the amplitudes of the sync and blanking components of the composite sync signal during type 0 intervals.

FIG. 3 illustrates in block diagram form a prior art reduced-memory sync generator arrangement. The arrangement of FIG. 3, designated generally as 320, accepts fixed-rate clock pulses at an input terminal 322 from a source (not shown) and generates at various output terminals composite sync and those signals from which a composite blanking signal is formed. The clock pulses are illustrated as 501 of FIG. 5. Since sync generator 320 may operate with equipment which processes color television signals in a sampled manner, it is desirable to use a clock signal frequency which is related to the color subcarrier frequency. Often, the clock signal is at $4 \times SC$. However, inexpensive present logic circuits cannot operate dependably at this frequency, so in the arrangement shown the clock signal is at a frequency of one-seventh of $4 \times Sc$. Clock signal 501 is applied to both a horizontal counter 324 and to a horizontal latch circuit 326 as illustrated in FIG. 3.

Horizontal counter 324 is a synchronous seven-bit binary counter, each of the cells or stages of which is coupled by an address line to a corresponding portion of a horizontal ROM 328. Horizontal counter 324 also produces on an output conductor 330 a signal illustrated as 410 of FIG. 4 having twice the horizontal frequency. This twice-horizontal-frequency signal is produced by dividing the frequency of clock signal 501 by an appropriate factor. Counter 324 is capable of a maximum count of 128, but is reset by a signal from an appropriate memory location in ROM 328 (by way of latch 326) at a clock pulse corresponding to the end of a horizontal line for the particular sync signal being generated. For a particular embodiment of the sync generator producing a standard NTSC sync signal, the clock frequency of clock signal 501 is 2.04545 MHz and the corresponding count of counter 324 is 65. Counter 324 is reset twice during each horizontal line.

The twice-horizontal frequency signal produced on conductor 330 by dividing 2.04545 MHz by the divisor 65 is applied to a vertical counter 332, to a divide-by-2-counter 336, and to a latch circuit 334. The counter 332 has a unique state during each half-line of a field. Vertical ROM 338 decodes the unique state of the counter 332 and for each state produces an output (outputs) from the corresponding memory location. ROM 338 must have a bit width or memory capacity at each location commensurate to the application. As in the arrangement of FIG. 2, one memory bit per location or address is used to generate the counter reset pulse. The reset pulse is generated when the appropriate count of counter 332 addresses the memory location of ROM 338 containing a logic 1 (for the positive-logic case), rather than the logic 0 occurring at all other prior addresses. The reset pulse is coupled from ROM 388 at output terminal 02. Other output signals of ROM 338 are the vertical drive signal, which appears at output terminal 03, and horizontal page selection signals which appear at output terminals 00 and 01 of ROM 338.

These various output signals of ROM 338 are applied to corresponding input terminals of a vertical latch circuit 334. Latch 334 acts to reclock the signals in accordance with half-line signal 410. This reclocking accommodates internal delays of counter 332 and ROM 338. In effect, the latch output signal corresponds to the ROM output signal for the preceding half-line. Vertical reset pulse 412, vertical drive pulse 414, and the horizontal page selector signals 416 and 418 as illustrated in FIG. 4 are generated at output terminals L2, L3, L0 and L1 respectively, of latch 334.

Each of the cells or stages of counter 332 is coupled by one of ten address lines (VA0-VA9) to a corresponding portion of vertical ROM 338. ROM 338 decodes the addresses represented by each unique state of counter 332 as it counts the twice-horizontal frequency signal applied to the counter input. Ten-stage counter 332 is capable of a maximum count of 1024, but is reset as described by the appropriately programmed ROM according to the required standard being generated. In this particular embodiment for producing a standard NTSC frame of 525 lines, counter 332 counts 525 twice-horizontal frequency pulses 410 (which have a duration of one-half horizontal line) during each field. For other standards, as for example the aforementioned 655-line standard for film compatibility, or the 625-line PAL or SECAM, counter 332 is reset during the appropriate count.

In a similar manner, counter 332 addresses ROM 338 to provide the vertical drive signal to latch 334. Latch 334 reclocks this drive signal to provide at output L3 the seven full lines duration vertical drive signal 414. Negative-going signal 414 begins between half line intervals 6 and 7 as illustrated in FIG. 4 and tends between half line intervals 20 and 21 (not shown) for NTSC. Since this signal 414 changes at one-half line intervals, no information from horizontal ROM 328 is required to generate it. Consequently, vertical drive signal 414 can be derived exclusively from vertical ROM 338. This is true in the case of all the above-mentioned standards, the only difference being the occurrence of the leading and trailing edges with respect to the zero labelled half line. The width in all of these standards is the same seven full lines at NTSC.

The page signals 416 and 418 at outputs L0 and L1, respectively, are used to identify which one of the types of intervals is currently being counted or generated, and this information is applied to horizontal ROM 328 at inputs HA8 and HA9 respectively. In particular, during the type 0 intervals both page signals are low. During type 1 intervals page signal 416 is high, while page signal 418 is low. In the type 2 intervals, page signal 416 is low, and page signal 418 is high. Type 3 intervals have the both signals 416 and 418 high. If it is desired to provide other signals, e.g., color bar gating signals or while balance cursor, then it is necessary to provide more page address lines from latch 334 to ROM 328, thus dividing each field into more intervals. However, for every new page address line, the size of ROM 328 must be doubled.

A problem is encountered due to the interlace structure of the NTSC frame, which requires a one-half line offset of the composite sync and blanking signals between successive fields. This is shown by signals 420 and 422 of FIG. 4 for field one as compared to signals 424 and 426 for field two. Since the counters are based on half scan line intervals, we can provide for interlace by a free-running counter (one that never gets reset) such as counter 336 operating at the line frequency. This free running clock 336 is 180° out-of-phase during the same vertical count in each of two successive fields due to the odd number of half-lines per field. Using the output signal 502 shown in FIG. 5 of clock 336 as address signal for address line HA7 for ROM 328 permits identification of which half of the selected "type of line" it is desired to be read out of memory for that one-half line interval. The two different half line intervals determined by counter 336, when taken in combination with the four types of intervals (type 0 - type 3) determined by the page signals, result in a total of eight half line intervals. These eight unique half-line intervals are sorted in eight corresponding pages on portions of horizontal ROM 328.

Figure 5:
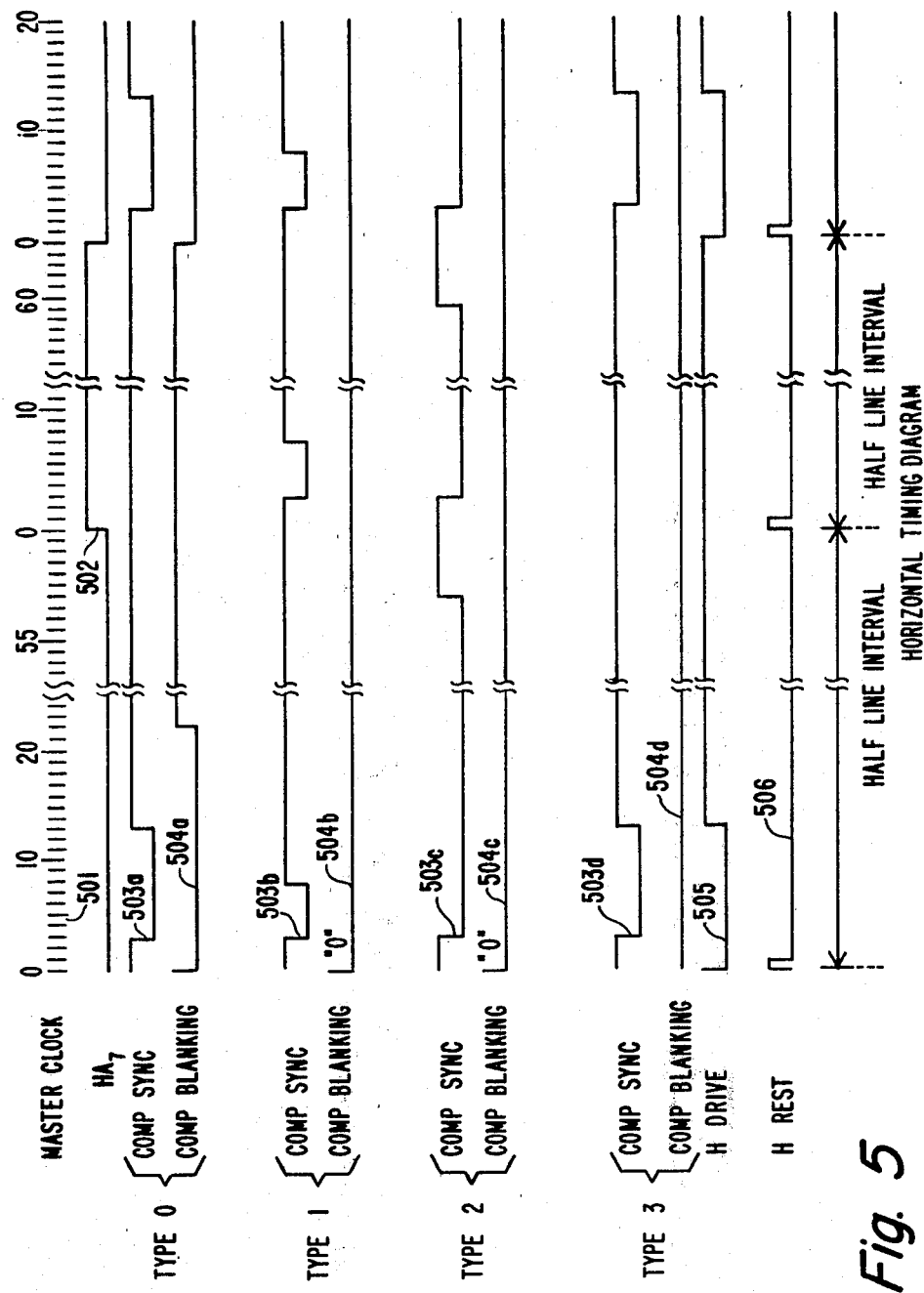

The seven address lines HA0–HA6 that originate from the horizontal counter 324 sequentially access the memory locations of horizontal ROM 328 and read out the stored amplitude of the timing signals from the pages of ROM memory addressed by the page signals in the time interval chosen by the master clock applied to input 332. These timing signals are shown in FIG. 5 for all eight half-line intervals. In particular, they are composite sync signals 503a, 503b, 503c, and 503d during intervals type 0 to type 3 respectively, which are present at output H00 of ROM 328. Signal 503a comprises the horizontal sync signal during active video signal, 503b is the equalizing pulses. Signal 503c comprises the vertical serrations, while signal 503d is the horizontal sync during the vertical blanking interval. Composite blanking signals 504a, 504b, 504c, and 504d are present during intervals type 0 to type 3 respectively at output H01. Signal 504a is the horizontal blanking during horizontal retrace, while signals 504b, 504c, and 504d are the blanking during the vertical blanking intervals, i.e., there is blanking during the entire horizontal scan as indicated by logic "0" throughout the scan. Horizontal drive signal 505 is present during intervals type 0 to type 3 respectively at output H02 and is the same for all interval types.

A horizontal reset signal 506 is shown, which is the same for all half line intervals, and it is present at output H03. The occurrence of the pulse therein is under the control of ROM 328, and the address or addresses at which it occurs can be changed in accordance with the desired standard to be generated and the clock frequency which is desired. In addition, if for a given standard, a higher resolution or accuracy is desired, a higher frequency clock signal at input 322 is required. This, in turn, requires a different place in ROM 328 in order for reset signal 506 to occur at the same time at the beginning of every half line.

All of the above-described signals generated by ROM 328 are present at the respective ROM 328 outputs one cycle of the clock signal at 322 sooner than shown in FIG. 5. They are applied to latch 326, which reclocks them in accordance with the clock signal at input 322. This is to compensate for the delays inherent in counter 324 and ROM 328. The composite sync, composite blanking, horizontal drive, and horizontal reset signals are available for any desired system application. Typically, the composite sync and composite blanking signals are coupled to a level-shifting circuit for creating the amplitude superposition necessary to form the composite sync and blanking waveform of FIG. 1. This corresponds functionally to the D-to-A converter 218 of FIG. 2.

Figure 6:
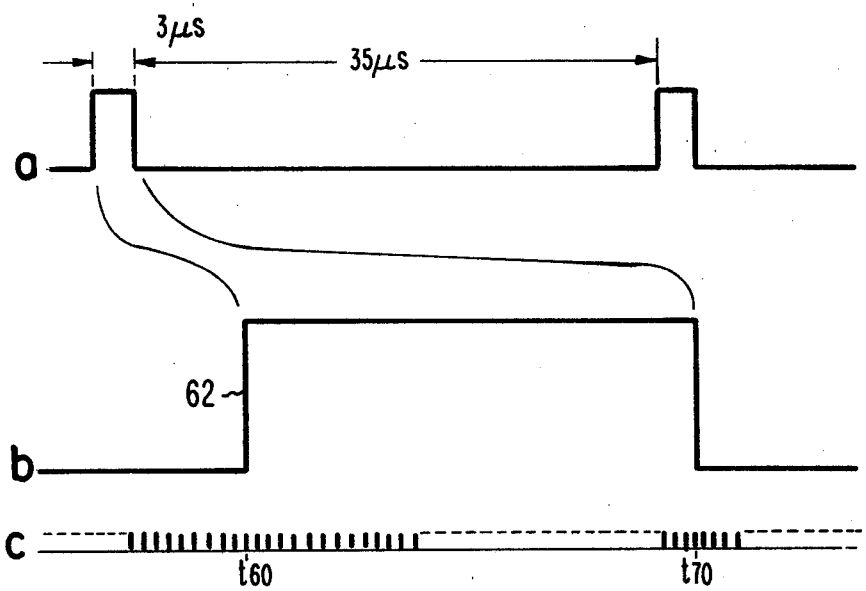
FIGS. 6 and 7 are pulse timing diagrams useful in understanding the invention.

FIG. 6 illustrates a part of the equalizing pulse interval. FIG. 6b illustrates in expanded form one equalizing pulse 62 and FIG. 6c illustrates 4×SC clock pulses to the expanded scale. In the vicinity of times t60 and t70 at which transitions take place in the pulse waveform, the clock pulses must be closely spaced to provide sufficient resolution. This may be especially true if the pulse edges are not abrupt as shown but have a finite risetime. For the interval between t60 and t70, however, the magnitude of pulses 62 does not change. Also, after time t70 there is an interval of about 35 μS in which the sync value is low. It can be seen that the regions around t60 and t70 requiring high resolution are relatively small, yet many memory locations must be provided for storing redundant information at high resolution everywhere else.

Figure 7:
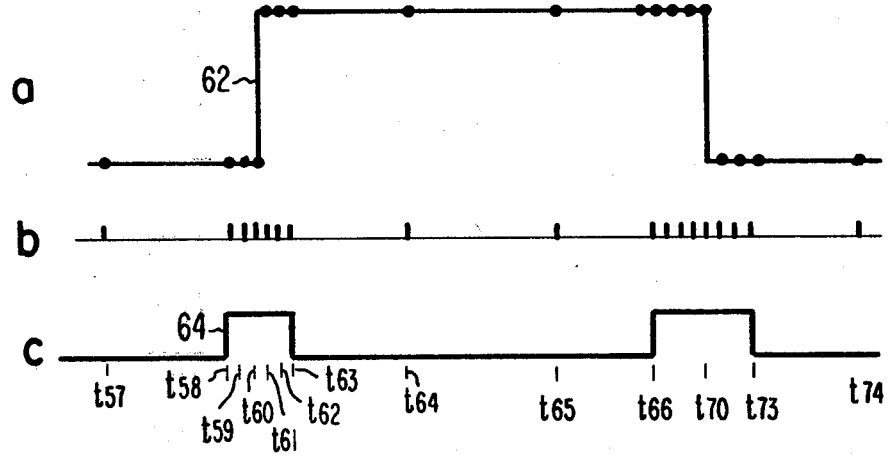

According to the invention, the clock rate is changed during the generation of the sync interval as shown in FIG. 7. As illustrated in FIG. 7b around time t60 and t70, many clock pulses are provided for high resolution. In the broad flat areas, few clock pulses are provided. This is accomplished by using an additional bit of memory at each address, preprogrammed with a logic 1 or in a pattern 64 as illustrated in FIG. 7c. Pulse pattern 64 represents the value of the additional bit at each memory location. A logic 0 is stored in the additional bits of the memory addressed by clock pulses t57 and earlier. This represents a low clock rate. The clock rate remains low until the next clock pulse occurs at time t58. When clock pulse t58 addresses the memory, the additional bit at that location has a logic 1, representing a high clock rate. The clock responds by switching to a high rate and in quick succession addresses t59, t60, t61 and t62 address locations, all of which have a logic 1 additional bit. The clock rate remains high after pulse t62 addresses a memory location, and t63 clock pulse occurs in quick succession. The corresponding memory at the t63 location is logic 0, representing a low clock rate. The clock returns to the low recurrence rate, and only three clock pulses occur at the low rate in the interval t63-t66. The additional bit addressed by clock pulse t66 is a logic 1, and the clock returns to the high speed mode for the duration of the high level of pulse 64. In this way, the number of memory locations required to be addressed can be very much reduced from about 43 in the arrangement of FIG. 6 to about 8 in FIG. 7.

Figure 8:
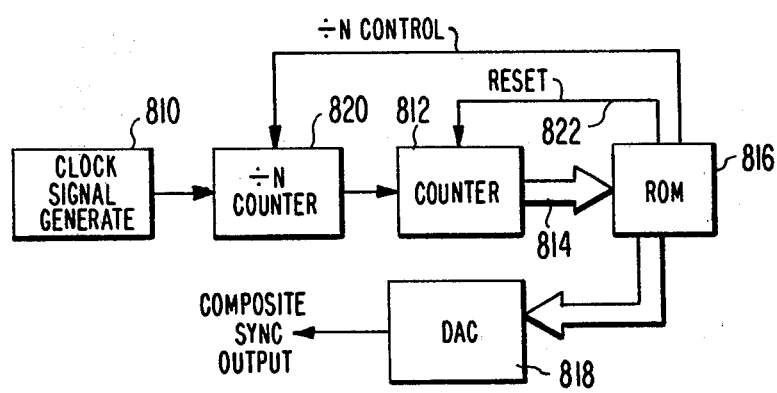
FIG. 8 is a simplified block diagram of an embodiment of the invention.

FIG. 8 illustrates a simplified block diagram of a reduced memory arrangement. FIG. 8 is similar to FIG. 2, except that an additional controllable counter 820 is included between clock signal generator 810 and counter/decoder 812. Counter 820 is of a known type in which the level of the logic signal on its control input determines the modulus by which the fixed-rate clock pulses from generator 810 are counted to produce piecewise-periodic clock signals as illustrated in conjunction with FIG. 7. Counter 820 may include for example a fixed divide-by-16 counter and a switch controlled by the control input which takes an output from the divide-by-16 counter or directly from the fixed clock.

Figure 9:
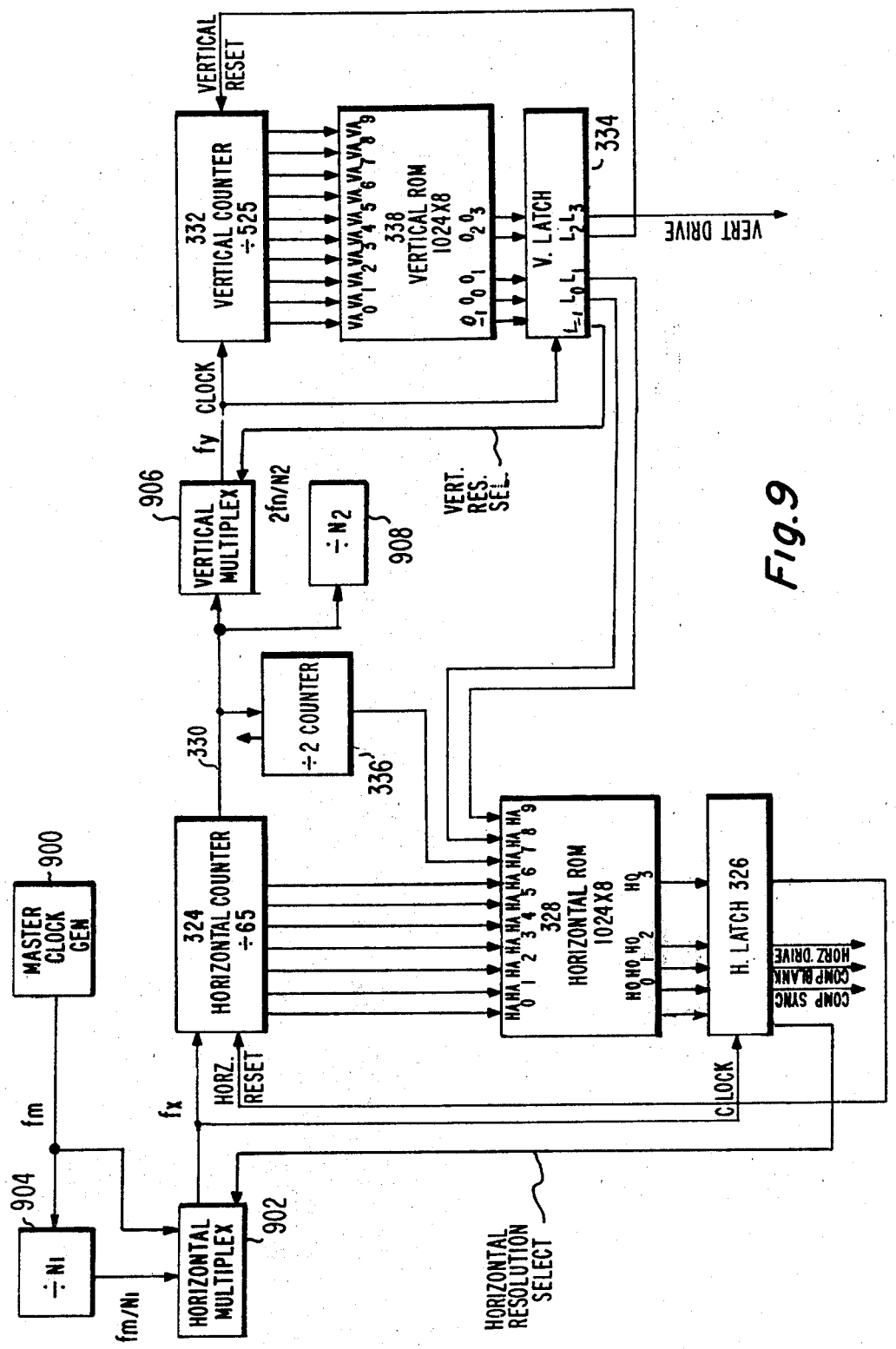
FIG. 9 is a detailed block diagram of the invention.

FIG. 9 is a detailed block diagram of a counter-ROM sync generator according to the invention. In this arrangement, elements corresponding to those in FIG. 3 have the same reference number. In FIG. 9, a master clock generator 900 produces fixed clock pulses $f_m$ which are applied to inputs of a multiplexer 902 and a divide-by-N1 counter 904. A horizontal resolution select signal taken from the additional bit in the memory and held by latch 326 is used to control the resolution as described previously on a line-to-line basis. Multiplexer 902 selects either the master clock or the divided master clock to advance horizontal counter 324. Similarly, a vertical resolution select signal is applied from vertical latch 334 to a vertical multiplexer 906 which selects either the counted-down output of horizontal counter 324 directly or the output of 324 further divided by N2 in counter 908.

Other embodiments of the invention will be apparent to those skilled in the art. For example, several different levels of resolution may be used in order to minimize the memory requirements, whereupon two or more additional bits would be necessary at each memory location. Rather than dividing down from a master clock generator, several clock generators at different rates might be used. The clocks can be slaved to sync or to burst in known manner. The resolution can be changed in many ways, as by having high resolution during only the entire vertical blanking interval and during each succeeding horizontal blanking interval.

What is claimed is:

1. A television synchronizing signal generator comprising:

first memory means for storing information relating to the magnitude of at least one component of a composite synchronizing signal at each of a predetermined plurality of sample points in each television frame;

clock signal generating means coupled with said memory means for generating signals for recurrently addressing said memory means for reading said information from said memory sample by sample for generating said component signal;

the improvement comprising;

controllable rate controlling means coupled with said clock signal generating means and with said first memory means for controlling the instantaneous rate to a value other than zero at which said first memory means is addressed for controllably changing the rate at which said samples relating to the magnitude of at least one component of a composite sync signal are generated; and second memory means coextensive with said first memory means and coupled with said first memory means for being addressed simultaneously therewith, said second memory means being adapted for being loaded with information relating to the rate at which said first memory means is addressed, said second memory means being coupled to a rate control input terminal of said controllable rate controlling means for changing the rate of addressing of said first memory means during each field, said controllable rate controlling means comprising a controllable counter, said controllable counter comprising, a fixed counter coupled to said clock signal generating means for generating a divided clock signal; and controllable multiplexing means coupled to said clock signal generating means and to said fixed counter for coupling to an output terminal thereof one of said divided clock signal and said clock signal in response to a control input, said control input being coupled to said second memory means for controlling said rate.

* * * * *